Feb. 13, 1968  H. J. WITKOWSKI  3,368,245
PLASTIC MOLD
Filed April 5, 1965

INVENTOR.
HENRY J. WITKOWSKI
BY Charles L. Lovercheck
attorney 3,368,245
PLASTIC MOLD
Henry J. Witkowski, 5625 E. Lake Road,
Erie, Pa. 16511
Filed Apr. 5, 1965, Ser. No. 445,523
2 Claims. (Cl. 18—42)

This invention relates to a mold for molding filters from foam plastic material.

In the mold disclosed herein a runner arrangement is provided wherein the plastic material which is injected into the mold at high pressure through a normal runner system moves through the runners in such a fashion as to minimize the velocity and pressure of the plastic and to eliminate piercing and totally encapsulating the foam material in the plastic material.

The control of flow of plastic through the runners is carried out by providing a particular structure of molds wherein the foam plastic material itself is compressed to approximately 80 percent of its free volume and the thermoplastic is injected into the mold in which the foam is so compressed.

It is, accordingly, an object of the invention to provide an improved mold.

Another object of the invention is to provide a mold for molding foam plastic filters.

And yet another object is to provide a mold for molding foam plastic filters which is simple, efficient, and convenient.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

Figure 1:
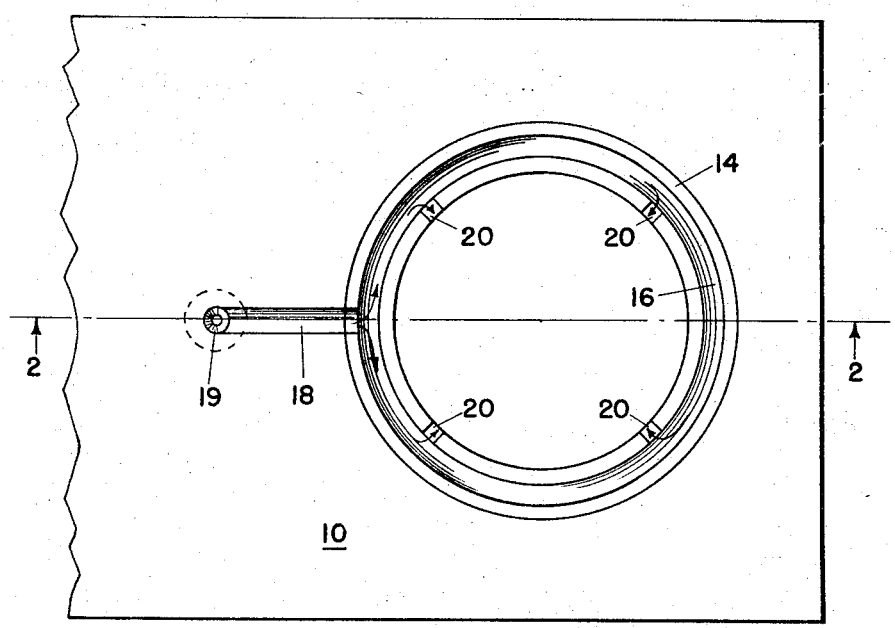
FIG. 1 is a bottom view of the top mold according to the invention.
Figure 2:
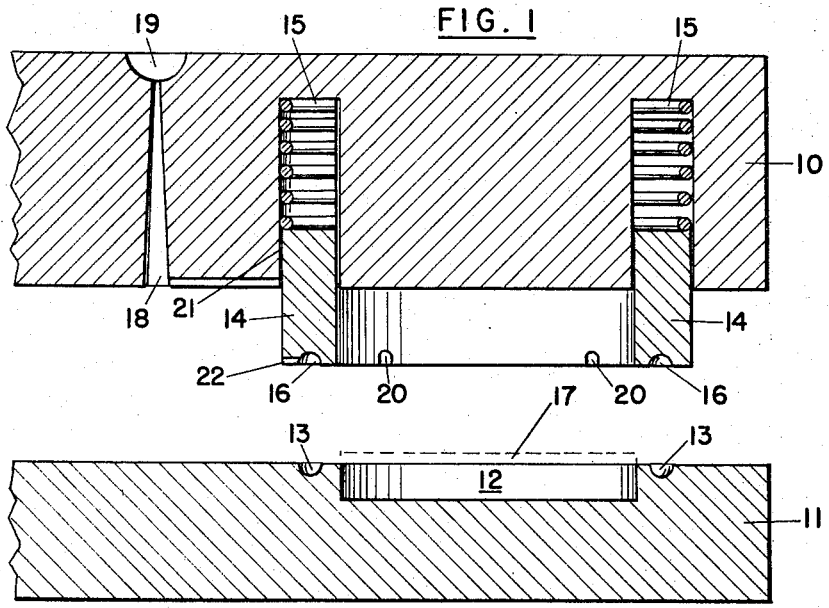
FIG. 2 is a longitudinal cross sectional view taken on line 2—2 of FIG. 1.

Now with more particular reference to the drawing, the top mold section 10 and bottom mold section 11 are designed to be used in a molding process in a conventional injection molding machine or the like. The top mold has an annular cylinder groove 21 which receives an annular piston 14 which has the form of a hollow cylinder supported in a groove 21 and urged by a spring 15 to extend from the mold half 10.

The lower mold half 11 has a cavity 12 therein and this cavity is adapted to receive a piece of foam plastic material 17. The cavity 12 is approximately 80 percent of the size of the foam plastic 17, so that when the mold halves 10 and 11 are put together the foam plastic material will be compressed between the mold halves and between and within the annular piston 14 to about 80 percent of its free volume.

An annular runner groove 13 in the bottom section 11 around the outer periphery of the cavity 12 and spaced therefrom communicates with the runner 18 which is in turn connected to the sprue 19. Annular groove 16 in piston 14 overlies groove 13 when the mold is closed.

The runner 18 is connected to the groove 16 by the runner opening 22 in the upper mold half so that molding material from the sprue 19 can be injected into the runner. It will be noted that when the plastic material is injected through sprue opening 19, it will flow through the runner 18 and through the opening 22 to the grooves 13 and 16 and build up a sufficient pressure to compress spring 15. This pressure will force the piston 14 upward against the force of the spring 15 and thus the pressure on the plastic in the groove will be released and the plastic material at low pressure will be injected into the outer periphery of the foam plastic material. Since the foam plastic material is somewhat compressed, the plastic material will enter the outer edge of the foam material and solidify therein. Thus when the foam material is removed from the mold the material in the outer edges will expand to its original volume. Thus, the outer periphery will be restrained.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A mold comprising a first mold section and a second mold section,
   a cavity in said first mold section,
   a runner groove in said first mold section spaced outward from said cavity,
   and means in said mold to introduce molten plastic to said runner groove,
   an annular groove in said second mold section,
   an annular piston in said annular groove in said second mold section, said annular piston surrounding said cavity,
   said piston overlying said runner groove when said mold sections are assembled and being adapted to move away from said first mold section when plastic is injected into said annular groove whereby plastic material may enter the sides of foam material in said cavity.

2. A mold for foam material comprising:
   a first and a second mold part,
   a cavity in one said mold part,
   an annular runnner in one said mold part spaced from and surrounding said cavity,
   a spring-urged piston in said second mold part overlying said runner,
   means in said second mold part urging said piston toward said mold part, said piston being adapted to be forced from said first mold part by plastic injected into said mold whereby said plastic may enter the outer edges of foam plastic in said cavity.

References Cited

UNITED STATES PATENTS

| 2,186,160 | 1/1940 | Anderson | 18—30 |
| 2,217,661 | 10/1940 | Anderson | 18—42 |
| 2,541,592 | 2/1951 | Lietaert | 16—42 |
| 2,668,329 | 2/1954 | Landau | 18—30 |
| 2,672,653 | 3/1954 | Simpkins et al. | 249—110 XR |
| 2,733,479 | 2/1956 | English | 249—110 XR |
| 2,770,011 | 11/1956 | Kelly | 18—42 |
| 2,994,920 | 8/1961 | Patera | 249—105 |
| 3,145,423 | 8/1964 | Horvereid | 18—42 |
| 3,183,552 | 5/1965 | Farkas | 18—42 |
| 3,213,490 | 10/1965 | Johnson | 18—42 |

FOREIGN PATENTS

| 1,132,319 | 6/1962 | Germany. |
| 1,330,440 | 5/1963 | France. |

J. HOWARD FLINT, Jr., *Primary Examiner.*